US010600302B2

(12) United States Patent
Cech (10) Patent No.: US 10,600,302 B2
(45) Date of Patent: Mar. 24, 2020

(54) SEATBELT AND CHILD SEAT ANCHOR BASED OCCUPANCY DETECTION SYSTEM

(71) Applicant: TK Holdings Inc., Auburn Hills, MI (US)

(72) Inventor: Leonard Cech, Brighton, MI (US)

(73) Assignee: JOYSON SAFETY SYSTEMS ACQUISITION LLC, Auburn Hills, MI (US)

(*) Notice: Subject to any disclaimer, the term of this patent is extended or adjusted under 35 U.S.C. 154(b) by 180 days.

(21) Appl. No.: 15/430,330

(22) Filed: Feb. 10, 2017

(65) Prior Publication Data
US 2017/0236395 A1    Aug. 17, 2017

Related U.S. Application Data

(60) Provisional application No. 62/294,063, filed on Feb. 11, 2016.

(51) Int. Cl.
| | |
|---|---|
| G08B 21/02 | (2006.01) |
| B60N 2/00 | (2006.01) |
| B60Q 5/00 | (2006.01) |
| G08B 21/04 | (2006.01) |
| B60N 2/28 | (2006.01) |

(52) U.S. Cl.
CPC ......... G08B 21/0236 (2013.01); B60N 2/002 (2013.01); B60N 2/2809 (2013.01); B60N 2/2893 (2013.01); B60Q 5/005 (2013.01); G08B 21/0211 (2013.01); G08B 21/0461 (2013.01)

(58) Field of Classification Search
CPC ............ G08B 21/0236; G08B 21/0211; G08B 21/0461; B60R 21/01542; B60R 21/01556; B60N 2/002; B60Q 5/005

USPC ......................................................... 340/449
See application file for complete search history.

(56) References Cited

U.S. PATENT DOCUMENTS

| | | |
|---|---|---|
| 6,104,293 A | 8/2000 | Rossi |
| 6,364,352 B1 | 4/2002 | Norton |
| 6,566,869 B2 | 5/2003 | Chamings et al. |
| 6,903,286 B2 | 6/2005 | Kaijala et al. |

(Continued)

FOREIGN PATENT DOCUMENTS

WO    WO 2008/063999 A2    5/2008

OTHER PUBLICATIONS

International Search Report and Written Opinion dated May 11, 2017 issued in PCT/U2017/017606.

(Continued)

*Primary Examiner* — Omer S Khan
(74) *Attorney, Agent, or Firm* — Gordon Rees Scully Mansukhani LLP (57) ABSTRACT

A system for detecting the presence of an occupant in a child seat is provided. The system includes at least two sensor modules positioned to detect acceleration of the child seat. The sensor modules provide signals representative of the acceleration detected at the first and send sensor modules to a controller. The controller includes signal processing circuitry for processing the signal to determine whether the signals received from the sensor modules are representative of the physiological motion of the occupant. The controller processes the signals received from the sensor modules to isolate acceleration of the child seat from the motion of the vehicle.

13 Claims, 6 Drawing Sheets

(56) References Cited

U.S. PATENT DOCUMENTS

| | | |
|---|---|---|
| 6,922,147 B1 | 7/2005 | Viksnins et al. |
| 7,401,834 B2 | 7/2008 | Browne et al. |
| 7,410,214 B2 | 8/2008 | Hayden et al. |
| 8,179,274 B2 | 5/2012 | Rork et al. |
| 8,258,932 B2 | 9/2012 | Wahlstrom |
| 8,610,569 B2 | 12/2013 | Lanta |
| 9,266,535 B2 | 2/2016 | Schoenberg |
| 2005/0121956 A1* | 6/2005 | Dolan .................... B60N 2/002 297/253 |
| 2008/0084290 A1 | 4/2008 | Hawkins |
| 2008/0094195 A1 | 4/2008 | Odate et al. |
| 2008/0119989 A1 | 5/2008 | Henning et al. |
| 2008/0272633 A1* | 11/2008 | Hayden ................. B60N 2/002 297/217.3 |
| 2009/0152933 A1 | 6/2009 | Casey |
| 2009/0237229 A1* | 9/2009 | Kautz .................... B60N 2/002 340/457 |
| 2014/0253313 A1* | 9/2014 | Schoenberg ............. B60N 2/28 340/457 |
| 2014/0276090 A1* | 9/2014 | Breed ...................... A61B 5/18 600/473 |
| 2015/0130605 A1 | 5/2015 | Helm |
| 2015/0265200 A1* | 9/2015 | Mahdi ................. A61B 5/0205 600/301 |
| 2017/0236395 A1 | 8/2017 | Cech |

OTHER PUBLICATIONS

Prasad R. Rudd, et al.; "Functional Assessment of Unattended Child Reminder Systems"; U.S. Department of Transportation—National Highway Traffic Safety Administration; (Report No. DOT HS 812 187); Jul. 2015; 76 pages.

Related U.S. Appl. No. 15/681,668, filed Aug. 21, 2017.

* cited by examiner

SEATBELT AND CHILD SEAT ANCHOR BASED OCCUPANCY DETECTION SYSTEM

CROSS REFERENCE TO RELATED APPLICATION

The present application claims priority to and the benefit of U.S. Provisional Patent Application No. 62/294,063 filed on Feb. 11, 2016. The foregoing provisional application is incorporated by reference herein in its entirety.

SUMMARY

The present application relates to a system for detecting the presence of a child in a child seat.

Systems to detect the presence of a child in a child seat have been developed and tested. These sensing systems may be integrated directly into the child seat structure, as indicated in a recent NHTSA report (DOT HS 812 187, July 2015), incorporated by reference herein. These systems are based on detection of the child seat through several sensing mechanisms including the measurement of pressure, force, latching clip detection, etc. Such systems are designed to include electronics within the seat for detection and communication to/from the vehicle and/or to/from cell phones. The system contains a microprocessor which receives the sensor and vehicle information as inputs. The system monitors conditions indicating the possibility that a child has been left behind in the vehicle. If the occupant of the seat is determined to be in an unsafe condition, the system may be configured to provide a variety of potential countermeasures including, for example, initiating a warning through the vehicle systems (e.g. horn alarm); modifying the vehicle cockpit (e.g. reducing/increasing cabin temperature; and/or initiate a warning through telematics (e.g. send a warning to parent/driver).

Additionally, detection of child seat occupancy may be done using camera based systems utilizing, for example, two dimensional and/or three dimensional cameras. As an alternative, child seat occupancy may be detected using active electromagnetics such as ultrasonic and/or acoustic sensors. Another child seat occupancy detection system may rely on weight sensors and function as a seat weight detection system, including optionally a belt tension sensor(s). All of these systems may be configured to detect child seats and classify them as occupied or un-occupied. All of the above methods may have shortcomings due to certain factors outside the system. These factors include, for example, due care (unusla position of the occupant; clothing on or objects possessed by the occupant, etc.), blocking obscurations of the camera, lack of motion or activity by the occupant, etc.

As described further below, the present application discloses an occupancy detection system that is configured to detect and measure occupant respiration.

BRIEF DESCRIPTION OF THE DRAWINGS

The features, aspects, and advantages of the present invention will become apparent from the following description, and the accompanying exemplary embodiments shown in the drawings, which are briefly described below.

FIG. 5 is an exploded view of the pretensioner portion of the retractor of FIG. 3.

FIG. 6 is a side view of the locking mechanism of the retractor of FIG. 2.

DETAILED DESCRIPTION

The present application is directed to a seat occupancy detection system that is configured to detect and measure the physiological motion of the occupant. The physiological motion detected by the system may be the physiological activity of the occupant's organs (e.g., heart rate, respiration) and/or responsive or involuntary motion of the occupant's body (e.g., sneezing, seizures, stretching, yawning, rubbing eyes, etc.) that may be discriminated from general motion of the body, the vehicle or seat using the sensor and processing modules described herein.

The system may be configured to detect whether a child seat is occupied. The system may include two or more sensor modules or nodes positioned at locations on/in a seatbelt and/or child seat latching system in mechanical communication with the child seat. The sensors modules may be configured to include one or more inertial sensors such as, for example, accelerometers. The sensors may be orthogonal tri-axial, inertial sensors that communicate to a processing module located in a controller 100 containing one or more processors or modules. The processing module continually receives sensor data and signals from the two or more sensor modules. The controller 100 and processing modules may also be configured to receive additional information the state of the vehicle (such as, for example, ignition state, gear state, temperature, window state, current estimated occupancy state—driver, passenger(s), . . . ).

In an exemplary embodiment the two or more sensor modules may be positioned in mechanical communication with universal anchor points and/or positioned in spatially separated positions on the seat belt which is in mechanical communication to the child seat or physically attached to the child seat in order to restrain the occupant of the child seat.

Figure 1:
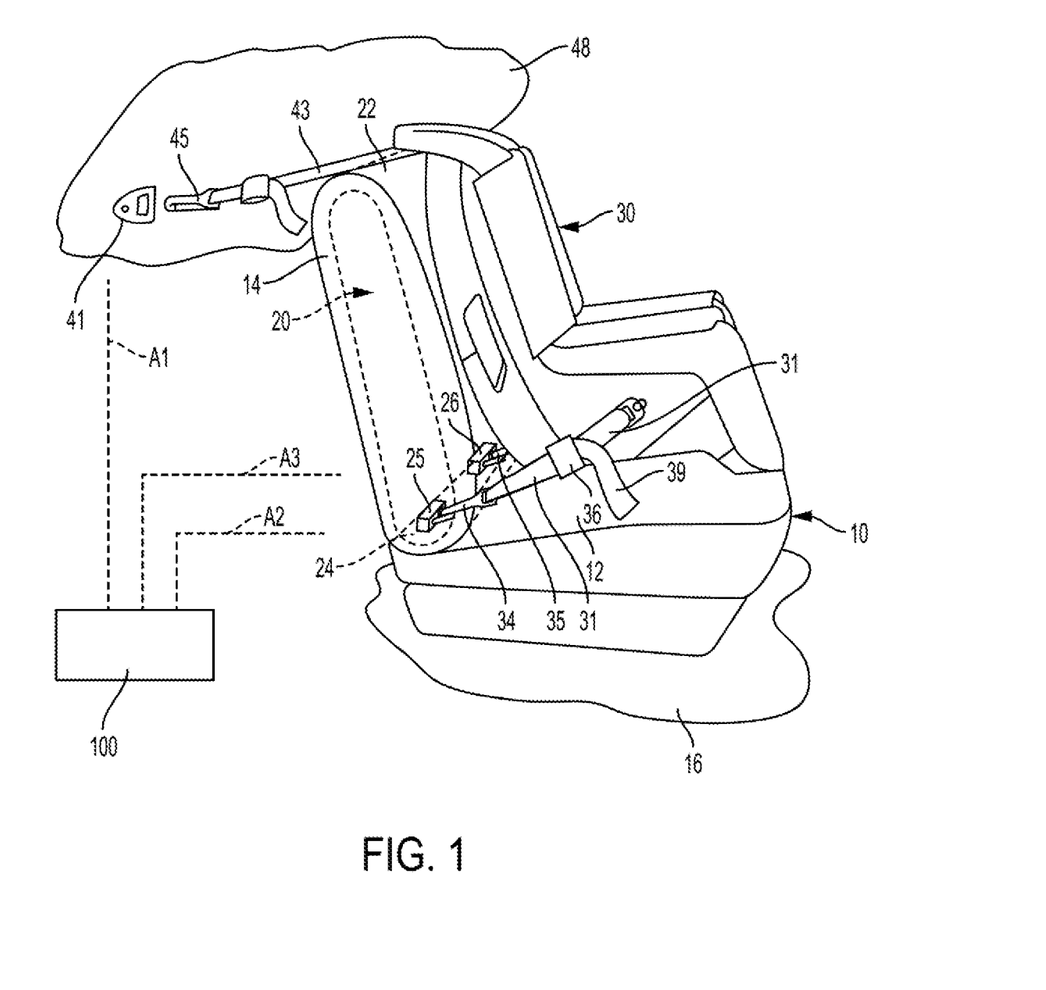
FIG. 1 is a side view of a vehicle seat containing a child seat in an anchored position.

As shown in FIG. 1, a vehicle seat 10 includes a seat portion 12 and a back portion 14. The back portion 14 is cantilevered to the seat portion 12 and the seat portion is anchored to the floor 16 of the vehicle. The back portion 14 may have a rigid frame 20 covered by padding and upholstery 22. The frame 20 may include a cross bar 24, which includes anchors 25, 26 to which a child restraint seat 30 is attached.

The child restraint seat 30 includes a pair of straps 31, 32 that are connected to hooked shaped connectors 34 and 35 for connecting the straps to the anchors 25, 26. The straps 31, 32 have fittings 36 and 37 which allow the straps to be adjusted in length between the child restraint seat 30 and the hooked connectors 34 and 35 by pulling on ends 39 and 40 of the straps. When the child restraint seat 30 is connected to the anchors 25, 26 by the straps 31, 32 the straps are tightened and pulled, tension is applied to the straps and, thus, a corresponding force is applied to the anchors 25, 26.

As is seen in FIG. 1, if the child restraint seat 30 is facing forward, a tether 43 with a hook 45 may be hooked into an seat back anchor 41 on the back 14 of the seat 10 or fixed to the vehicle frame 48 as shown in FIG. 1.

Based on FMVSS regulations (49 CFR Parts 571 and 596 [Docket No. 98-3390, Notice 2], RIN 2127-AG50), vehicles must include standardized latches for fixation of child seats in vehicle, independent of the seat belts. Theses latches are secured at universal child anchor points identified by the relevant FMVSS regulations. An example of such anchor points are indicated in FIG. 1.

For certain vehicle states (e.g. driver out of vehicle, all doors closed, all windows closed, no HVAC controls) it may be beneficial to monitor and collect the data carried by the signals being provided by the two or more sensor modules to the controller 100 processing module. The processing module may include a microprocessor based algorithm to detect and monitor human motions within the seat based on the data. By using two or more sensor modules (preferably three or more), various analytical methods such as principle components analysis (PCA) or other similar state detection and classification algorithms can isolate motion within the seat from three dimensional motion experienced by the entire vehicle (e.g. rigid body vibration due to wind or road noise).

Figure 2:
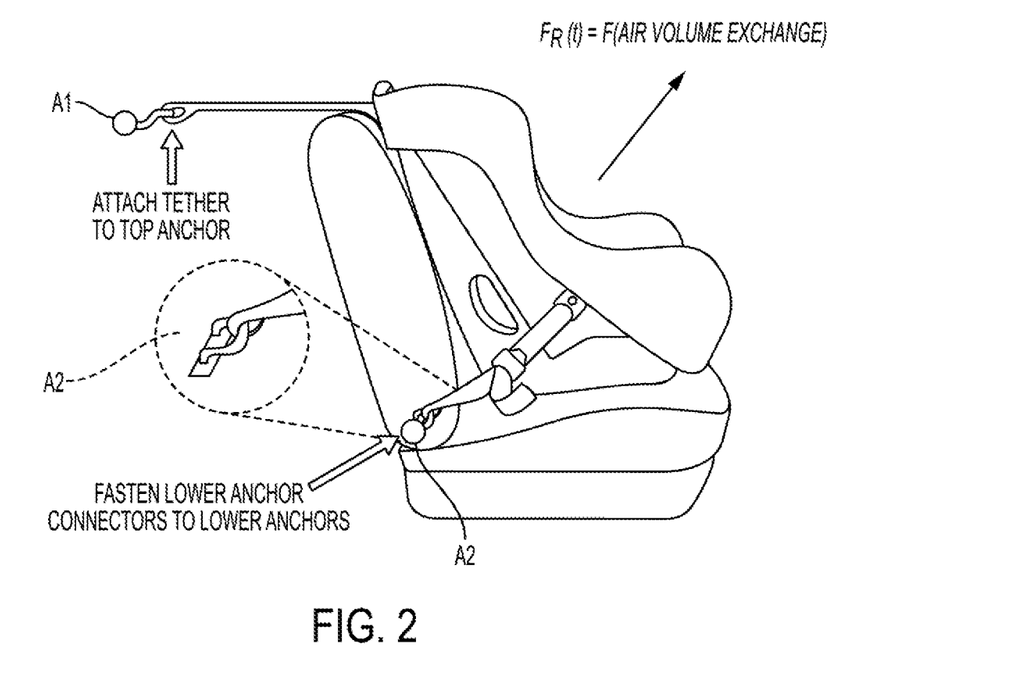
FIG. 2 is a side view of a vehicle seat containing a child seat showing the relative position of the anchor points and the force vector related to breathing of the occupant.

As indicated in FIG. 2, provided that one or more of the anchor points are rigidly in communication with the child seat (a standard arrangement for an anchored child seat), the physiological motion of a child within the seat (e.g., breathing normally, or moving) will induce a spatially distributed reaction force on the child seat. Child seats include a rigid exterior and, thus, the child's physiological motion will induce non-uniform accelerations to the child seat, which are mechanically transferred to the anchors or restraining belt. The sensors, described above, are positioned in mechanical communication with the belt and/or anchors.

Figure 3:
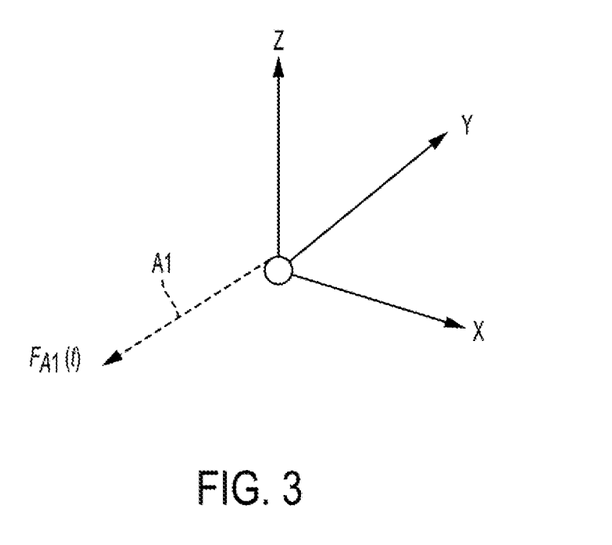
FIGS. 3-5 are three dimensional representations of the relative magnitude and direction of the accelerometer signals ($F_{A1}$, $F_{A2}$, $F_{A3}$, . . . ).
Figure 4:
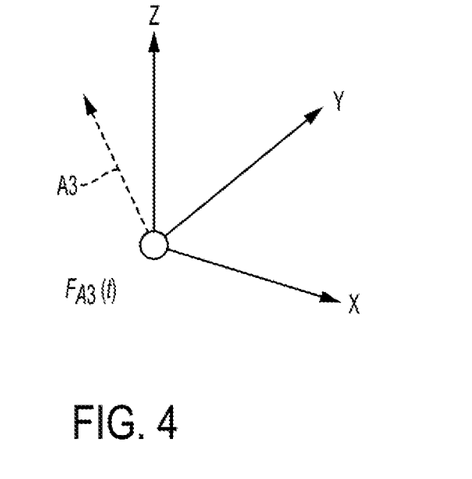
Figure 5:
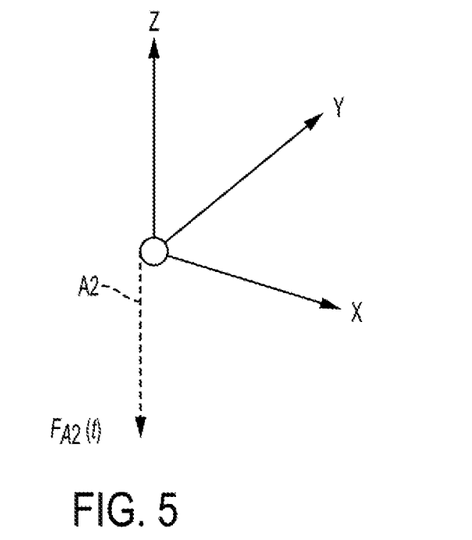
Figure 6:
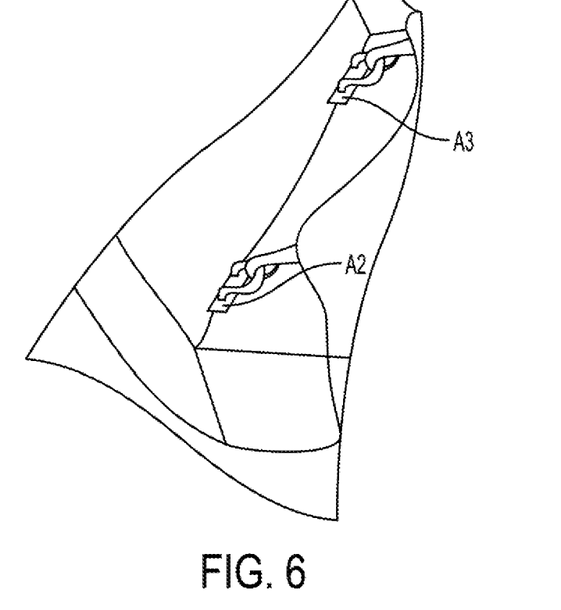
FIG. 6 is a partial close up showing the location of the acceleration sensors (A2, A3) in the vehicle seat.

As shown in FIG. 2, a force related to physiological motion of the occupant is applied to the seat by the occupant. As shown in FIGS. 3-5, the force may be detected at the different sensor modules (A1, A2, A3). The sensor modules provide representative signals to the controller 100.

The signals provided by the inertial sensors (e.g., accelerometers) may be analyzed by the processing module. For example, the processing module may identify amplitude and phase differences between the different signals (i.e., channels). The controller may utilize these differences (e.g., using a machine learning process) to classify patterns of human physiological motion (e.g. breathing, crying, talking, moving, etc.). The number of sensors employed, sensitivity of the acceleration sensors may by adjusted or chosen in order to allow for detection of respiration for the most challenging condition(s) (such as, for example, "due care" conditions, detection of newborn sleeping, one or more anchor points loosened, etc.).

In order to provide useful functionality in certain situations, such as, for example a situation in which it is likely that a child has been left behind, the system processing module may be configured to include an algorithm which can detect relatively small patterns (e.g., sinusoidal patterns) associated with physiological motion (e.g., respiration), indicating the seat is occupied. Any detection/classification algorithm(s) would be temporal function(s) of the nodal accelerometer signals (FA1, FA2, FA3, . . . ) as indicated in FIG. 2. Standard real time digital/analog signal processing techniques (e.g. filtering, correlation, . . . ) may be employed to further accentuate the target signals The system described herein, could also be used as an independent sensor system in combination with other systems, such as vision, when combined, improve reliability and performance of the occupant classification function.

As mentioned above, the controller 100 and processing modules may be configured to process the signals received from various occupancy sensor modules in combination with various signals received related to the state of the vehicle (such as, for example, ignition state, gear state, temperature, window state, current estimated occupancy state—driver occupancy, passenger(s) occupancy, etc. For example, the system may be configured so that the controller provides a warning signal causing a driver alert (e.g., horn or alarm activation, mobile phone alert) if the child seat is occupied and the temperature in the vehicle exceeds a predetermined set point. A similar warning signal could be produced if the child seat is occupied and the vehicle is locked with the driver and passenger seats unoccupied. Various other conditions could be monitored and the controller could be configured to activate a warning signal if appropriate.

Figure 7:
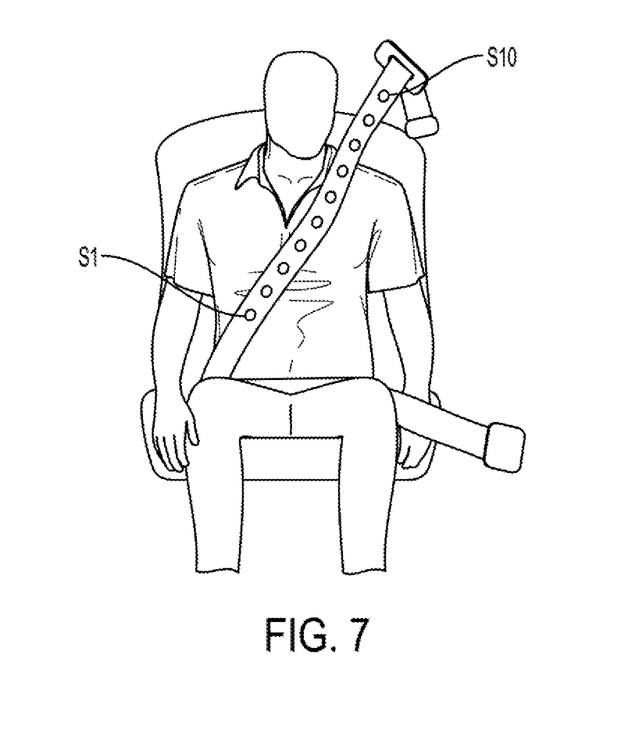
FIG. 7 is a rear facing view of an occupant in a vehicle seat wearing a seat belt containing several acceleration sensors (S1 . . . S10).
Figure 8:
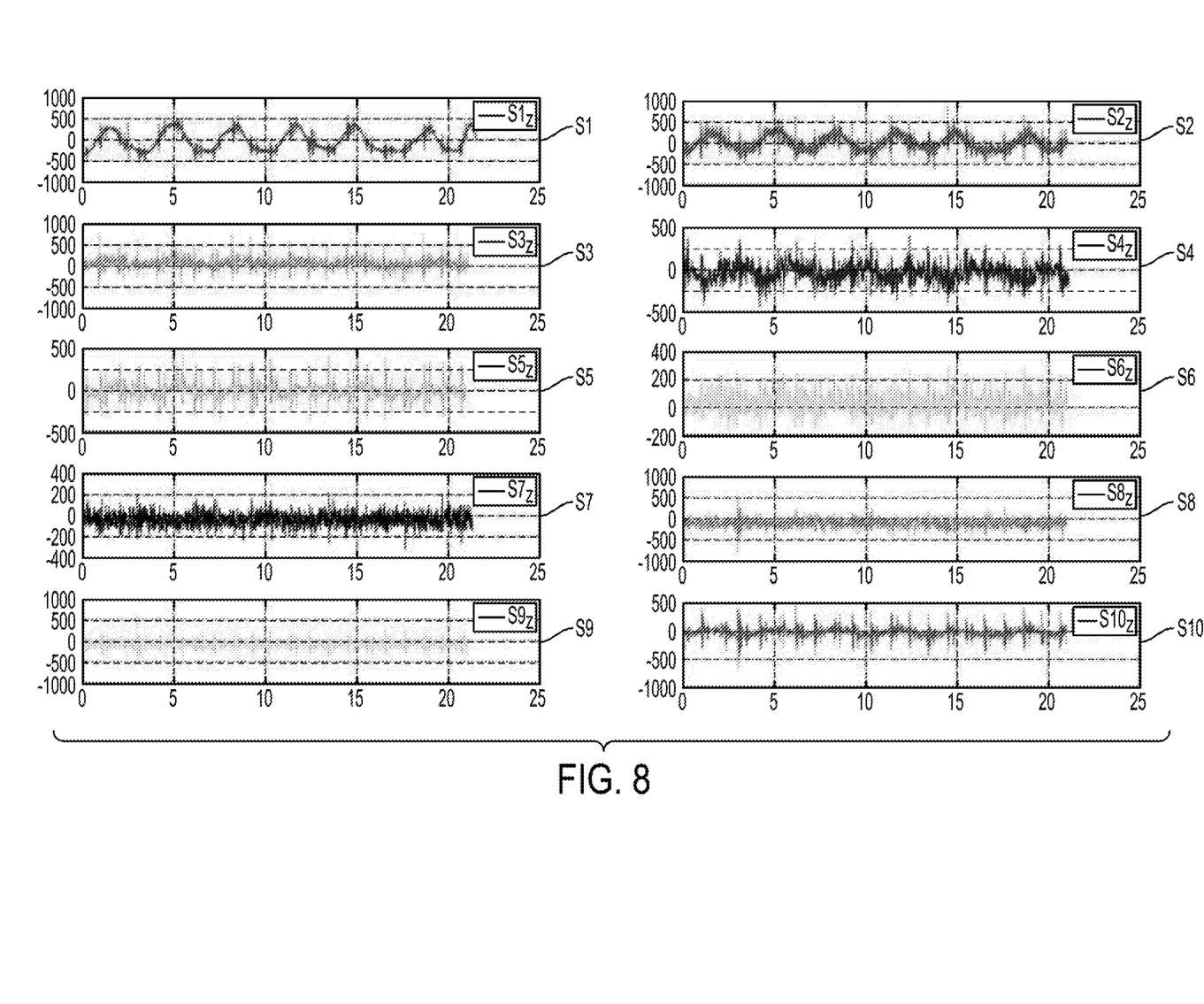
FIG. 8 is a graphical representation of the raw signal (amplitude v. time) of the signal produced by each acceleration sensor shown in FIG. 7.

As shown in FIG. 7, to illustrate the concepts of an alternative system on a full size adult, 10 triaxial accelerometers (S1-S10) are placed on a standard seatbelt and monitored continuously for a still adult. As shown in FIG. 8, an analysis of the signals can be performed to identify patterns of both respiration and heart rate clearly. Also, as expected, the phase and amplitude of signal levels is a function of the placement of the sensors and the physical respiration mechanical function of the subjects body (e.g., the signals received from accelerometers S1, S2 clearly indicate motion of the diaphragm of the occupant, indicating respiration cycles of inhale/exhale; while the signals received from accelerometers S5, S10 clearly indicate patterns indicating heart rate of the occupant).

Figure 9:
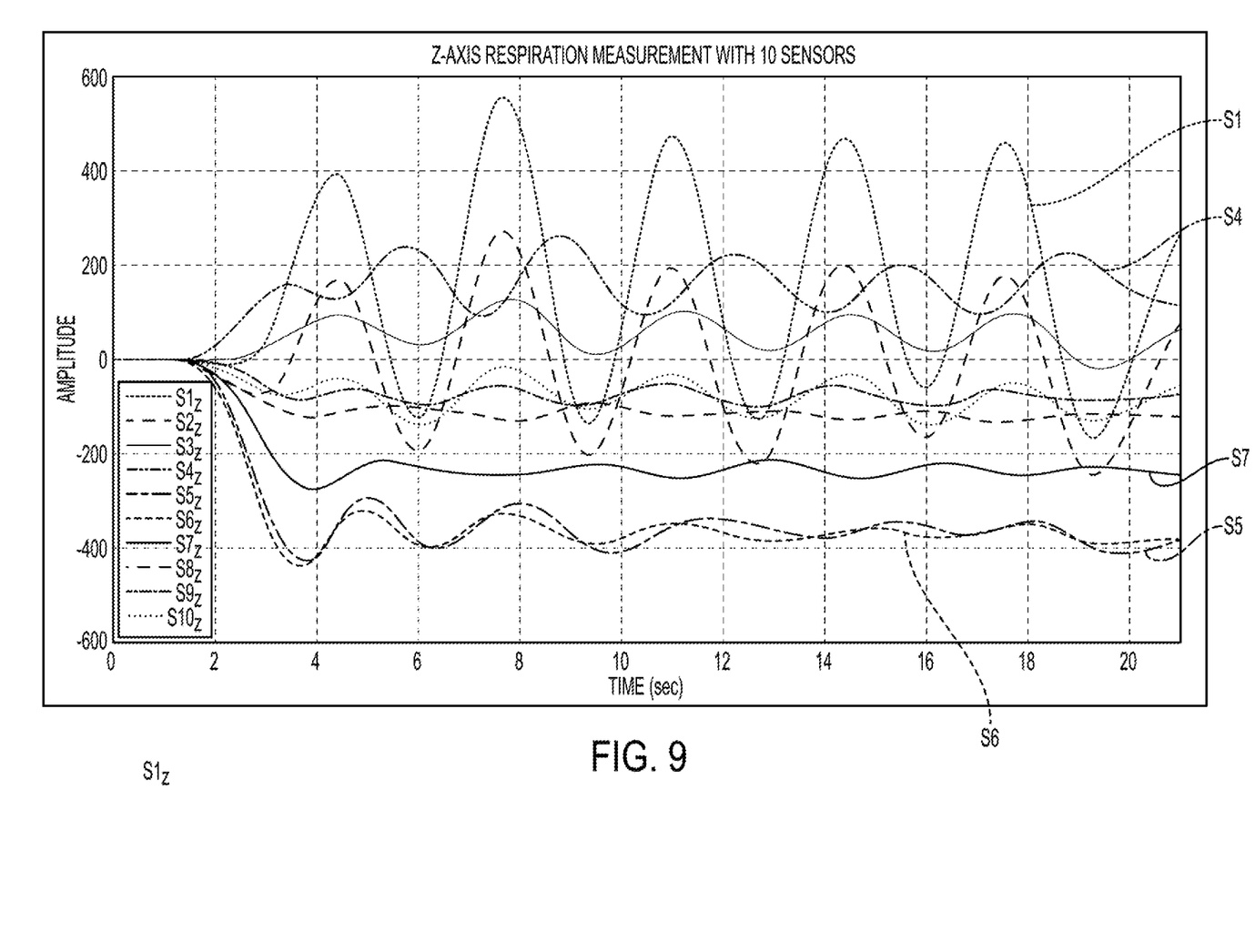
FIG. 9 is a graphical representation of the signals of FIG. 8 after the signal has passed through a low pass filter.

As shown in FIG. 9, the signals from the various sensor modules and associated accelerometers may be filtered to improve the analysis. A low pass filter may be provided in the signal processing circuitry located in the sensor module. The circuitry may be implemented in the form of software so that a low pass filter may not be needed. Various processing of the accelerometer signal may be conducted such as described in U.S. Pat. No. 8,258,932 (incorporated by reference herein). However, such existing processing techniques do not contemplate mounting the sensor directly in mechanical connection to the child seat, which provides enhanced detection and improved operability. The system disclosed in the foregoing patent monitors acceleration of the vehicle and not the force and acceleration of the child seat (or occupant) directly by processing signals received from sensor nodes located in mechanical connection to the child seat or occupant restraining system.

Additional algorithms and signal analytical techniques may be utilized in order to provide enhanced assessment of the state of a child located in the child seat. For example, weight, stature, activities (e.g. laughing, crying, physiological actions, health, . . . ) and a basis for safety, comfort and convenience actuations based on a given detected state of the child determined by processing the signals received from the sensor modules (e.g., A1, A2 and A3).

As described above, the embodiments of the system described herein provides for the detection of the occupancy of a child seat, independent of a child seat type/style and device. The system provides for the detection of the occupancy through physiological signals transferred through mechanical communication to appropriately positioned sensor nodes. The system may be configured to provide for classification of the child and/or the state of the child located in the child state.

What is claimed is:

1. A system for detecting the presence of an occupant in a child seat intended to be placed in a seat of a vehicle, the system comprising:
a first sensor module and second sensor module positioned to detect acceleration of the child seat; and
wherein the child seat is secured to an anchor mounted to the vehicle by a strap directly connected to the anchor; and
wherein the child seat, the strap, and the anchor are mechanically linked such that the acceleration of the child seat is transferred to the strap, the first sensor module includes an accelerometer that detects a measure of the force in the strap as a representative measure of the acceleration of the child seat, and wherein the measure of force in the strap is taken at the anchor;
signals representative of the acceleration of the child seat detected at the first and second sensor modules are provided to a controller; and
the controller includes signal processing circuitry for processing the signals representative of the acceleration of the child seat to classify patterns of human physiological motion in response to determination that the signals representative of the acceleration of the child seat corresponds to non-uniform acceleration.

2. The system of claim 1, wherein the accelerometer is mounted to the anchor.

3. The system of claim 1, wherein the signal processing circuitry is configured to process the signals received from the first sensor module and the second sensor module in order to detect the respiration of the occupant.

4. The system of claim 1, wherein the signal processing circuitry is configured to process the signals received from the first sensor module and the second sensor module in order to detect a specific movement of the occupant.

5. The system of claim 4, wherein the specific movement includes yawning.

6. A system for detecting the presence of an occupant in a child seat intended to be placed in a seat of a vehicle, the system comprising:
a first sensor module and a second sensor module positioned to detect acceleration of the child seat; and
wherein the first sensor module is a tri-axial accelerometer;
the first sensor module and the second sensor module are located on anchors that are connected to the vehicle;
the child cheat is connected to the anchors to secure the child seat to the vehicle by a strap directly connected to the anchor;
wherein the child seat, the strap, and the anchor are mechanically linked such that the acceleration of the child seat is transferred to the strap, the first sensor module detects a measure of force in the strap as a representative measure of the acceleration of the child seat, and wherein the measure of force in the strap is taken at the anchor;
signals representative of the acceleration of the child seat detected at the first sensor module and the second sensor module are provided to a controller;
the controller processes the signals representative of the acceleration of the child seat received from the sensor modules to isolate acceleration of the child seat from the motion of the vehicle;
the controller is configured to determine a presence of the occupant and classify patterns of human physiological motion of the occupant based on the signals representative of the acceleration of the child seat received from the first sensor module and the second sensor module and based on the determination that the signals representative of the acceleration of the child seat corresponds to non-uniform acceleration.

7. The system of claim 6, further comprising a third sensor module positioned to detect acceleration of the child seat.

8. The system of claim 7, wherein the second sensor module and the third sensor module are tri-axial accelerometers.

9. The system of claim 7, wherein the controller is configured to process the signals received from the third sensor module, and classifies a specific movement of the occupant causing a corresponding motion of the child seat.

10. The system of claim 6, wherein
the controller is configured to receive input related to the state of the vehicle; and
the controller is configured to provide a specific output based on both the state of the vehicle and the determined presence of the occupant in the child seat.

11. The system of claim 10, wherein the controller is configured to provide a warning signal if the child seat is occupied and the temperature in the vehicle exceeds a predetermined set point.

12. The system of claim 10, wherein the controller is configured to provide a warning signal if the child seat is occupied and the vehicle is locked with driver and passenger seats unoccupied.

13. A system for detecting the presence of an occupant in a child seat intended to be placed in a seat of a vehicle, the system comprising:
a first sensor module and a second sensor module positioned to detect acceleration of the child seat;
wherein the child seat is secured to an anchor mounted to the vehicle by a strap;
the first sensor module includes an accelerometer mounted to the anchor that detects a measure of the force in the strap as a representative measure of the acceleration of the child seat;
signals representative of the acceleration of the car seat detected at the first and second sensor modules are provided to a controller; and
the controller includes signal processing circuitry for processing the signals in order to classify patterns of human physiological motion in response to determination that the signals representative of the acceleration of the child seat corresponds to non-uniform acceleration;
the controller configured to receive input related to the state of the vehicle; and
the controller is configured to provide a specific output based on both the state of the vehicle and the determined presence of the occupant in the child seat;
wherein the controller is configured to provide a warning signal if the child seat is occupied and the vehicle is locked with the driver and passenger seats unoccupied.

* * * * *